United States Patent Office 3,485,875
Patented Dec. 23, 1969

3,485,875
PRODUCTION OF PRIMARY AMINES
Lawrence W. Menapace, Beacon, N.Y., assignor to Texaco Inc., New York, N.Y., a corporation of Delaware
No Drawing. Filed June 28, 1967, Ser. No. 649,471
Int. Cl. C07c 87/06, 85/10; B01j 11/08
U.S. Cl. 260—583                                    7 Claims

ABSTRACT OF THE DISCLOSURE

Process for producing secondary alkyl primary amines and, in particular, secondary alkyl primary amines having from 10 to 25 carbon atoms wherein a $C_{10}$–$C_{25}$ mono-nitroparaffin in a paraffin hydrocarbon medium is reacted with hydrogen in the presence of a rhodium catalyst. The process is particularly suited for the production of secondary alkyl primary amines from crude nitrated paraffin compositions.

---

This invention relates to the production of amines and more particularly the production of secondary alkyl primary amines having from 10 to 25 carbon atoms from mono-nitroparaffins.

Secondary alkyl primary amines can be prepared from $C_{10}$–$C_{25}$ paraffin hydrocarbons by initially nitrating the paraffin with nitric acid or nitrogen dioxide and thereafter reducing with hydrogen the nitroparaffin in the presence of a hydrogenation catalyst. Known hydrogenation catalysts include nickel, copper, platinum, palladium and Raney nickel among others and their use has been suggested in reducing organo nitro compounds to corresponding amino compounds. However, to effect substantial conversion with such catalysts the reduction has been found to require the assistance of such solvent mediums as water, ethers, or alcohols. The use of such mediums, however, presents disadvantages in that their use requires elaborate separation and recovery techniques along with costly processing conditions and equipment. Moreover, polar mediums such as alcohols are destructive to catalyst life in that the catalyst is progressively solubilized and lost particularly in continuous operations. Conversely, in the instance where it is desired to convert nitroparaffins in paraffin hydrocarbon solvents to corresponding amines, and particularly crude nitrated paraffin compositions, that is, compositions containing from 5 to 45% nitroparaffins, and 95 to 50% $C_{10}$–$C_{25}$ paraffins along with lesser amounts of oxygenated and polyfunctional materials, conventional hydrogenation catalysts of the type mentioned above have been unsatisfactory and demonstrate little or no detectable catalytic activity in the conversion of the nitroparaffin to the amine.

It is therefore an object of this invention to provide a process for converting, in a paraffin hydrocarbon medium, mono-nitroparaffins to secondary alkyl primary amines.

Another object of this invention is to provide a process for reducing, in a paraffin hydrocarbon medium, mono-nitroparaffins to corresponding amines in high yields.

Other objects and advantages will become apparent from a reading of the following detailed description of the invention.

Broadly, this invention contemplates a process for producing secondary alkyl primary amines which comprises reacting a mono-nitroparaffin having from 10 to 25 carbon atoms in a paraffin hydrocarbon medium with hydrogen in the presence of a rhodium catalyst.

Mono-nitroparaffins which are suitable for the instant process constitute secondary nitro-n-paraffins wherein the nitro group is randomly positioned along the carbon chain on other than a terminal carbon atom. Mono-nitroparaffins contemplated include 2,3,4 or 5-nitrodecane, 2,3,4,5 or 6 nitroundecane, 2,3,4,5 or 6 nitrododecane, 2,3,4,5,6, or 7 nitrotridecane, 2,3,4,5,6 or 7 nitrotetradecane, 2,3,4,5,6,7,8 or 9 nitro-octadecane, and mixtures thereof as, for example, mixtures of $C_{10}$–$C_{14}$ nitroparaffins. The applicable mono-nitroparaffins are prepared, for example, by contacting a $C_{10}$–$C_{25}$ paraffin hydrocarbon, preferably a straight chain hydrocarbon in a liquid phase with a vaporous nitrating agent such as nitrogen dioxide or nitric acid at a temperature ranging from about 250–500° F. at from 1 to 20 atmospheres.

The illustrative nitration reaction briefly outlined above whether performed batchwise or continuous is generally permitted to proceed until about 5 to 50% of the paraffin has been converted yielding a crude nitrated product of about 5 to 45% mono-nitroparaffin, and 95 to 50% unreacted paraffin along with lesser amounts of $C_{10}$–$C_{25}$ ketone, alcohol, carboxylic acid and polyfunctionals. The mono-nitroparaffins so prepared may, if desired, be separated and recovered from the crude product as by distillation and subsequently hydrogenated to the corresponding amine after dilution with the paraffin hydrocarbon. However, it is advantageous to hydrogenate the crude material directly wherein the unreacted paraffin constitutes the reaction medium. Preferably, the crude nitrated product is caustic washed with, for example, sodium bicarbonate, ammonium hydroxide, sodium hydroxide or potassium hydroxide to remove acid by-products following nitration and prior to hydrogenation. Caustic washing at this point has been found to be beneficial in prolonging catalyst life. Where the nitroparaffin feedstock is provided substantially free of acid by-products or contaminants, neutralization may be omitted.

According to this invention the nitroparaffins are hydrogenated in the presence of a rhodium catalyst at temperatures ranging from about 100–400° F. and preferably between 200 and 350° F. Hydrogen pressures ranging from about 10 to 200 atmospheres, and preferably between 20 and 40 atmospheres, have been found to be applicable. The hydrogenation reaction is exothermic in nature and temperatures exceeding 400° F. should be avoided. At temperatures above 400° F. secondary alkyl primary amines interact, liberating ammonia along with substantial formation of undesirable secondary amine.

To maintain the reaction temperature below 400° F. it has been found advantageous to conduct the hydrogenation reaction in the presence of a $C_{10}$–$C_{25}$ hydrocarbon solvent or diluent. In a highly preferred embodiment the unreacted $C_{10}$–$C_{25}$ paraffin hydrocarbon which forms a component of the crude nitrated material constitutes the reaction medium.

The use of such paraffin hydrocarbons as mentioned above dictates against the use of conventional hydrogenation catalysts earlier mentioned in that conversion rates of the nitroparaffin to primary amine are severely curtailed. Unexpectedly, it has been found that rhodium catalysts contemplated in the instant process maintain high conversion rates in such solvent medium.

Rhodium catalysts contemplated in the practice of this invention include 100% rhodium along with rhodium supported or impregnated on or in an inert base. Where the rhodium supported catalysts are desired, the rhodium constitutes from about 0.5 to 95 weight percent or higher of the combined catalyst. Supports or bases found to be applicable include Kieselguhr, silica, alumina, pumice, asbestos, carbon and silica gel among others. A highly preferred catalyst has been found to be 0.5 weight percent rhodium on alumina. The contemplated supported rhodium catalysts are well known to the catalyst art and may in general be prepared by treating the support with a solution of rhodium salt, evaporating the water and calcining the catalyst. The proportions of nitroparaffin to catalyst are not critical and the optimum proportions are readily determined by experiment. In general, the higher the ratio of catalyst to nitro compounds the more rapid the reaction.

The process described above is applicable to batchwise or continuous operations. Suitable reactors may be charged and pressurized, agitation preferably being provided, and the reaction allowed to proceed and controlled by hydrogen pressure. Alternatively, continuous operations may be employed wherein the solvent-nitro-paraffin mixture is permitted to pass through and over the rhodium catalyst in the presence of hydrogen and under the conditions of temperature and pressure mentioned above at space velocities ranging from about 50 to 0.1 v./v./hr.

Operating in accordance with the above procedure nitroparaffin conversion to the corresponding amine has yielded 100% conversion in batchwise operations and 80% conversion in continuous operations.

Conventional recovery procedures may be employed in recovering the amine as by distilling the crude reaction product by stepwise fractionation. Alternatively, the amine may first be converted and recovered as an amine salt by reaction with an inorganic acid, followed by further treatment of the amine salt with alkali and thereafter recovering the primary amine by distillation. In copending application Ser. No. 650,242 filed June 30, 1967 entitled Separation and Purification of Secondary Alkyl Primary Amines by Siegart et al. and assigned to Texaco Inc., a process is described for recovering primary amines from crude hydrogenated nitroparaffin mixtures by initially treating the crude product with measured amounts of water and an inorganic acid, subsequent washing of the isolated aqueous amine salt layer with a low boiling paraffin, and thereafter by neutralization and recovery. This copending application is herein incorporated by reference.

The amines produced according to this process may be employed as mold release agents, emulsion freeze-thaw stabilizers, pigment dispersing agents, polyurethan catalysts and anti-caking anti-dusting agents. Their use is also indicated as corrosion inhibitors, deleterious bacteria control agents, sludge dispersants and as detergents and deicers in gasoline. The following examples are illustrative of the invention but the scope of the invention is not to be limited thereby.

EXAMPLE I 2200 gm. (3040 cc.) of n-decane was charged to a steel reactor. The reactor was equipped with a condensor which condensed any volatilized decane and water of reaction, returning the condensate to a separator wherein the hydrocarbon layer was drawn off and returned to the reactor. The condenser was maintained at 80–100° F. and the reaction mixture heated to 280° F. The reaction medium was mixed by bubbling $NO_2$ through the decane at a rate of 84.6 gm. per hour for 6.1 hours. A total of 2457 grams of crude nitration product was obtained along with 71 grams of water. The crude nitrated product was washed at ambient temperature with five portions of 200 cc. saturated sodium bicarbonate solution and thereafter washed 3 times, 200 cc. portions of water. The washed product was then dried and filtered to yield 2390 grams of product. Gas chromatographic analysis of the washed product showed it to contain on a weight percent basis 55.8 decane, 8.1 $C_{10}$ ketone-alcohol mixture, and 36.1 nitrodecane.

22 cc. (15.2 grams) of the above crude nitrated product was charged to a high pressure rocker bomb along with 30 cc. (21.9 grams) of decane and 5 grams of 5 percent rhodium-on-alumina catalyst. The bomb was sealed, hydrogen introduced, the temperature of the bomb raised to 122° F. and the pressure maintained at 200 p.s.i.g. for 24 hours. The hydrogenated product was dried and gas chromatographic analysis showed complete conversion of the nitrodecane to aminodecane. Based on this analysis the crude hydrogenated product contained 4.2 grams of aminodecanes, 1.2 grams of decanols and decanones and 30.4 grams of decane.

1.0 gram of anhydrous HCl is added to the hydrogenated product with stirring along with 121 ml. of water and the layers separated. The organic layer contains about 29 grams decane and 1.2 grams decanols and decanones. The aqueous layer contains about 5.2 grams aminodecane hydrochlorides and 1.4 grams decane. The aqueous layer is washed twice with 125 ml. portions of pentane. 1.1 grams of NaOH in 10 ml. of water is added to the aqueous layer and the resulting organic layer separated. After stripping off about 4 grams of pentane and water, about 4.2 grams of crude aminodecanes remains. Distillation of this product at 20 torr to a head temperature of 206° F. yields about 3 grams of 99 wt. percent pure aminodecanes.

EXAMPLE II 9.5 grams of crude nitrated product from Example I was mixed with 146 grams (200 cc.) of decane to produce a solution containing 3.4 grams nitrodecanes, 0.77 gram of decanols and decanones and 151.3 grams decane. This solution was mixed with hydrogen and charged at a rate of 60 cc. per hour to a 1 inch diameter high pressure tubular reactor packed with glass beads in the preheater section and 20 cc. of catalyst consisting of 0.5 percent rhodium-on-alumina. The operating pressure in the reactor was 500 p.s.i.g. and the temperature of the preheater and catalyst zones were 390° F. The reactor was mounted vertically and the reactants charged down flow to the reactor. Based on gas chromatographic analysis 80 weight percent of the nitrodecane had been converted to aminodecanes. Anhydrous HCl, 0.5 gram is added to the hydrogenated product with stirring along with 250 cc. of water and the layers separated. The organic layer contains 0.69 gram nitrodecane, 0.77 gram decanols and decanones and 150.6 grams decane. The aqueous layer contains 2.85 grams aminodecane hydrochlorides and 0.7 gram decane. The aqueous layer is washed twice with 250 cc. portions of pentane. The addition of 0.6 gram of NaOH results in the formation of an organic layer consisting of about 2 grams of pentane and water and 2.3 grams of crude aminodecanes.

I claim:
1. A process for producing secondary alkyl primary amines comprising:
   (a) nitrating a paraffin hydrocarbon having from 10 to 25 carbon atoms to obtain a mixture containing from 5 to 45% secondary mono-nitroparaffin and 95 to 50% of said paraffin hydrocarbon, and
   (b) reacting said mixture of (a) with hydrogen at a temperature of from about 100 to 400° F. and under a pressure of from about 10 to about 200 atmospheres in the presence of a rhodium catalyst.
2. The process of claim 1 wherein said catalyst is a rhodium catalyst supported on a base.
3. The process of claim 1 wherein said catalyst is rhodium supported on alumina.
4. The process of claim 1 wherein said paraffin hydrocarbon is a mixture of $C_{10}$–$C_{14}$ paraffin hydrocarbons and where said secondary mono-nitroparaffin is a mixture of $C_{10}$–$C_{14}$ secondary mono-nitroparaffins.
5. A process according to claim 1 wherein said mixture is reacted in step (b) at a temperature between 200 and 350° F. and under a hydrogen pressure of from about 20 to 40 atmospheres.
6. A process for producing secondary alkyl primary amines comprising:
   (a) nitrating a paraffin hydrocarbon having from 10 to 25 carbon atoms to obtain a mixture containing 5 to 45 percent secondary mono-nitroparaffin having from 10 to 25 carbon atoms, 95 to 50 percent of said paraffin hydrocarbon and the remainder being

$C_{10-25}$ ketone, alcohol, carboxylic acid and polyfunctions;
(b) treating said mixture of (a) with caustic and removing said acid from said mixture;
(c) passing said treated mixture of (b) over a rhodium catalyst at space velocities ranging from about 50 to 0.1 v./v./hr. at a temperature of from about 100 to 400° F. and under a hydrogen pressure of from about 10 to 200 atmospheres; and
(d) recovering secondary alkyl primary amines from the product of step (c).

7. A process according to claim 6 wherein said catalyst is rhodium supported on alumina, where said temperature ranges from about 200 to 350° F. and where said hydrogen pressure is from 20 to 40 atmospheres.

References Cited

UNITED STATES PATENTS

| | | | |
|---|---|---|---|
| 2,174,498 | 9/1939 | Johnson | 260—583 |
| 3,336,386 | 8/1967 | Dovell et al. | 260—583 X |

FOREIGN PATENTS

| | | |
|---|---|---|
| 713,109 | 7/1965 | Canada. |

CHARLES B. PARKER, Primary Examiner

R. L. RAYMOND, Assistant Examiner

U.S. Cl. X.R.

252—472; 260—644